United States Patent
Fitzgerald

(10) Patent No.: US 7,733,783 B2
(45) Date of Patent: Jun. 8, 2010

(54) ETHERNET NETWORK AVAILABILITY

(75) Inventor: Jeffrey J. Fitzgerald, Amherst, NH (US)

(73) Assignee: Cedar Point Communications, Inc., Derry, NH (US)

( * ) Notice: Subject to any disclaimer, the term of this patent is extended or adjusted under 35 U.S.C. 154(b) by 1051 days.

(21) Appl. No.: 10/727,118

(22) Filed: Dec. 2, 2003

(65) Prior Publication Data
US 2005/0018612 A1 Jan. 27, 2005

Related U.S. Application Data

(60) Provisional application No. 60/430,720, filed on Dec. 3, 2003.

(51) Int. Cl.
G01R 31/08 (2006.01)

(52) U.S. Cl. ............... 370/236.2; 370/248; 370/249; 370/252

(58) Field of Classification Search ........... 370/248, 370/249, 251, 252, 236.1, 236.2
See application file for complete search history.

(56) References Cited

U.S. PATENT DOCUMENTS

| 3,783,250 | A | | 1/1974 | Fletcher et al. | |
|---|---|---|---|---|---|
| 4,745,593 | A | * | 5/1988 | Stewart | 370/244 |
| 4,751,510 | A | * | 6/1988 | de Saint Michel et al. | 370/249 |
| 4,984,264 | A | * | 1/1991 | Katsube | 379/197 |
| 5,012,468 | A | | 4/1991 | Siegel et al. | |
| 5,123,089 | A | | 6/1992 | Beilinski et al. | |
| 5,335,222 | A | * | 8/1994 | Kamoi et al. | 370/230 |
| 5,537,395 | A | * | 7/1996 | Alles et al. | 370/236 |
| 5,627,766 | A | | 5/1997 | Beaven | |
| 5,630,046 | A | | 5/1997 | Loise | |
| 5,726,972 | A | | 3/1998 | Ferguson | |
| 5,757,772 | A | * | 5/1998 | Thornberg et al. | 370/236 |
| 6,079,036 | A | * | 6/2000 | Moharram | 714/712 |
| 6,115,393 | A | | 9/2000 | Engel et al. | |
| 6,269,083 | B1 | * | 7/2001 | Nagata et al. | 370/248 |
| 6,272,208 | B1 | * | 8/2001 | Kasrai | 379/15.03 |
| 6,404,733 | B1 | | 6/2002 | Shah et al. | |
| 6,446,222 | B1 | | 9/2002 | Phaal | |
| 6,487,593 | B2 | | 11/2002 | Banks | |
| 6,560,723 | B1 | | 5/2003 | Matsui | |
| 6,563,795 | B1 | * | 5/2003 | Gruber et al. | 370/248 |
| 6,690,648 | B2 | * | 2/2004 | Niida et al. | 370/236 |
| 6,721,801 | B2 | | 4/2004 | Najjar | |
| 6,747,957 | B1 | | 6/2004 | Pithawala et al. | |
| 6,768,720 | B1 | * | 7/2004 | Kamstra et al. | 370/245 |
| 6,931,568 | B2 | | 8/2005 | Abbondanzio et al. | |
| 7,460,482 | B2 | * | 12/2008 | Pike | 370/241 |

(Continued)

FOREIGN PATENT DOCUMENTS

JP 401101751 A * 4/1989

Primary Examiner—Ricky Ngo
Assistant Examiner—Phuongchau B Nguyen
(74) Attorney, Agent, or Firm—Ropes & Gray LLP

(57) ABSTRACT

Disclosed is a method and apparatus for improving LAN availability and robustness employing adjacency status self-discovery on segment-to-segment communications paths. In some embodiments, the method and system may employ Logical Link Control Type 1 test frame messages between segment nodes to determine status. Adjacent node status may be determined by waiting a period of time for an acknowledgment message and marking the tested link as "down" if no response is received. Also disclosed is a method for compacting data transmitted over a network to reduce overhead.

17 Claims, 2 Drawing Sheets

U.S. PATENT DOCUMENTS

2002/0012320 A1* 1/2002 Ogier et al. ................. 370/252
2002/0041570 A1* 4/2002 Ptasinski et al. ............ 370/252
2002/0120773 A1* 8/2002 Caveney ..................... 370/248
2005/0147107 A1* 7/2005 Powers et al. ............... 370/397

* cited by examiner

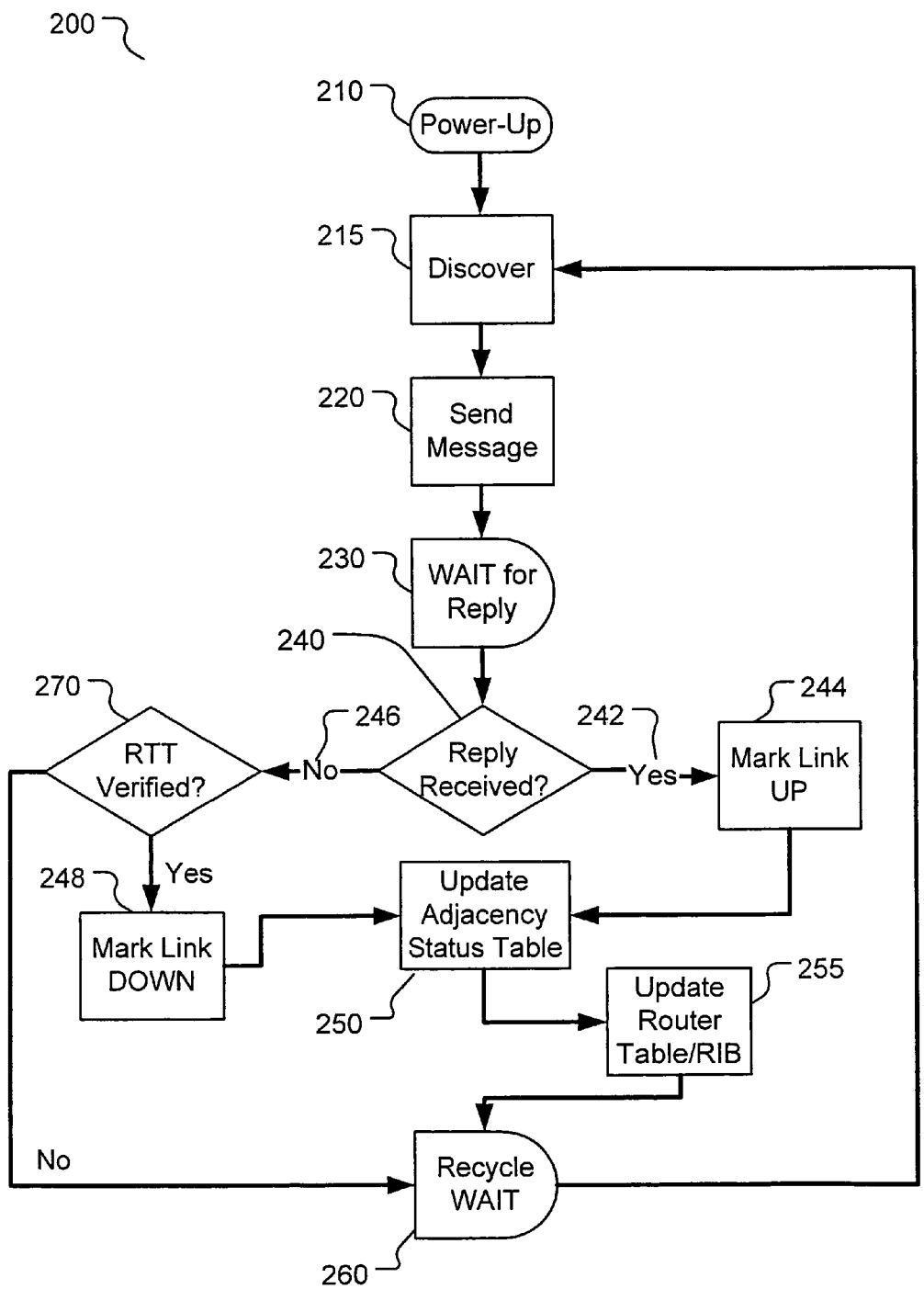

ETHERNET NETWORK AVAILABILITY

REFERENCE TO RELATED APPLICATIONS

This application claims priority to Provisional Application Ser. No. 60/430,720, filed on Dec. 3, 2003, and incorporated herein by reference in its entirety.

BACKGROUND OF THE INVENTION

1. Field of the Invention

The invention disclosed herein relates to computer network communications and, in particular, network management protocols.

2. Description of the Related Art

In the well-known Wide Area Network (WAN) architecture, all communications paths (or links) are point to point. In such networks, the nodes (or host computers) communicate with each other directly. Reliable WAN link up/link down status mechanisms are well known at both the physical layer and the data link layer (layers 1 and 2 of the well-known open systems Interconnect [OSI] Reference Model). These status mechanisms allow link faults to be determined in tens of milliseconds to one or two seconds.

However, in Local Area Network (LAN) architectures status determination is not as readily available. In part because LAN network protocols, such as Ethernet, are connectionless and support multiple accesses, several problems arise.

Firstly, an Ethernet LAN (by far the most common) can be partitioned into multiple subnetworks or segments. A given node (such as, but no limited to, a host computer, load balancing device, or router) on such a LAN is not aware of any segmentation. If a node faults, there is not necessarily any notification (e.g. a "loss of carrier" signal) to other nodes on its segment or to other segments. Secondly, there is generally no "keep alive" or "link up" check mechanism to determine whether the link or links to a particular node are working or if the node is still "listening" or has left the segment.

What is needed is a fast, reliable link up/link down statusing protocol operating on top of the existing Ethernet protocol in layer 2. Such a protocol would provide a ready means of determining network integrity and readiness. Furthermore, such a protocol must have multiple access capabilities (a "multi-access" protocol) and be compatible with the Ethernet protocol generally.

SUMMARY

Presently disclosed is a method and apparatus for improving local area network (LAN) availability by implementing a standards-based link up/link down status detection protocol on segment-to-segment communications paths. Also disclosed is a method to increase data throughput by employing a compaction method that substitutes fixed values in a packet header with a tag value. This reduces the amount of data that needs to be processed and allows for quicker amortization of overhead.

The protocol for determining the status may employ the industry-standard Logical Link Control (LLC) Type 1 "test frame," described in IEEE Standard 802.2, to provide Ethernet status test messages and return responses. Continuous status information thus provided enables greater LAN efficiency by enabling rapid routing table updates in the LAN (or attached WAN), thus avoiding inefficient routing to or through disabled or unavailable (down) nodes.

According to one embodiment, a method of improving network availability in a segmented network includes the acts of periodically transmitting a test message over a plurality of communication links from a source node in communication with a source network segment to a plurality of destination nodes, each of the plurality of destination nodes being in communication with a respective destination network segment; generating, for each of the plurality of destination nodes, a return message if the test message is received at the destination node; determining the status of each of the plurality of communication links in response to the return messages generated by the plurality of destination nodes; and providing the status of the plurality of communication links to each of the plurality of destination nodes that generated a return message.

In another exemplary embodiment, the method disclosed first detects the initial state of the network by observing the routing table at the local host or node on which the method is operating. That node may be a router, load balancer, firewall, special-purpose device or simply a host connected to the network.

Next, messages are sent by that node to all connected nodes on the network. These messages are preferably LLC Type 1 test frame messages, but other standard types of compact messages are useable.

In one embodiment, the present method may operate simultaneously on all nodes in the network segment to be protected. Each node then performs its own self-discovery of adjacency and the status of the adjacent nodes and links. This information is then used to update an adjacency status table at each node with adjacency information seen from the perspective of that node.

In an alternate embodiment, less than all of the nodes in the segment may utilize the present method. More than one node should preferably operate, however, in order to provide redundancy.

In another embodiment, a fault in one of the one or more paths may be present if the source node does not receive at least a predetermined number of return messages from the destination nodes in response to a predetermined number of test messages transmitted to the destination nodes.

The status can be determined by waiting a pre-determined period of time for a return acknowledgment message, in one embodiment a simple echo of the transmitted test frame. If the status of any node has changes, as denoted by the failure to receive a return message from that node signifying either a node or a link failure, the sending node updates its local adjacency status table. The status changes may then be incorporated into the local RIB/routing table, which is then propagated to all other routers on the network through standard means well-known in the art.

Because each router will update its adjacency status table each time the local message/response cycle is completed, reflecting the true state of all links, LAN efficiency will be improved by avoiding routes through dead links or to unresponsive nodes. For example, a response wait period of approximately one second will allow router table updates approximately every few seconds, instead of the 5 to 10 minutes seen in the prior art. A test message is typically not sent within the same segment.

One or more of the nodes performing the above status discovery process may be, in some embodiments, simply one of the hosts on the network, or a dedicated device configured to act as a router (as that term and function is known in the art) with the added functionality necessary to implement the presently-disclosed methods. Alternately, one or more of the status-discovering nodes may be a specially-adapted hardware and/or software device dedicated to this function.

In an alternate embodiment, the local node may update its copy of the network routing table directly upon determining that a node on the network (or network segment) has not responded to the test message. The modified routing table may then be advertised and propagated to all other routers on the network.

According to another aspect of the invention, a system for improving availability includes a plurality of destination nodes in communication with a respective one of a plurality of destination network segments, each of the destination nodes configured to receive a test message through one of a plurality of communication links and generate a return message; a source node in communication with each of the plurality of destination nodes, the source node configured to provide a test message to each of the plurality of destination nodes, and for determining the status of each of the plurality of communications links in response to the return messages; and a configuration update module in communication with the source node and the plurality of destination nodes, the configuration update module providing a status message to each of the destination nodes that provides a return message to the source node.

According to yet another aspect of the invention, a system for improving network availability in a segmented network includes a first network segment having a plurality of connected source nodes; a second network segment having a plurality of connected destination nodes, the second network segment connected to the first network segment over one or more paths; identification means for identifying from one or more source nodes one or more cooperating destination nodes; transmission means for periodically transmitting a test message over the one or more paths from a source node to one or more destination nodes; the transmission means in response to a return message received from the destination nodes, determining the status of the one or more paths; and status update means for providing the status to each of the plurality of destination nodes that generated a return message.

According to yet another aspect of the invention, a 'compaction' method 'substitutes' fixed values in a packet header with a 'tag' value. In one embodiment, IPv4 frames which are not-optioned and not fragmented are selected, which allows for removing the 'version', 'ihl', 'flags' and fragment offset fields, saving 3 bytes. The Total Length and Checksum fields are then removed, saving an additional 4 bytes. Five bits are removed from the Type of Service Field, and three bits are removed from the Time to Live Field.

BRIEF DESCRIPTION OF THE DRAWINGS

The present disclosure may be better understood and its numerous features and advantages made apparent to those skilled in the art by referencing the accompanying drawings.

FIG. 2 is a flowchart of a method of increasing LAN efficiency, according to one embodiment of the invention.

The use of the same reference symbols in different drawings indicates similar or identical items.

DETAILED DESCRIPTION

Figure 1:
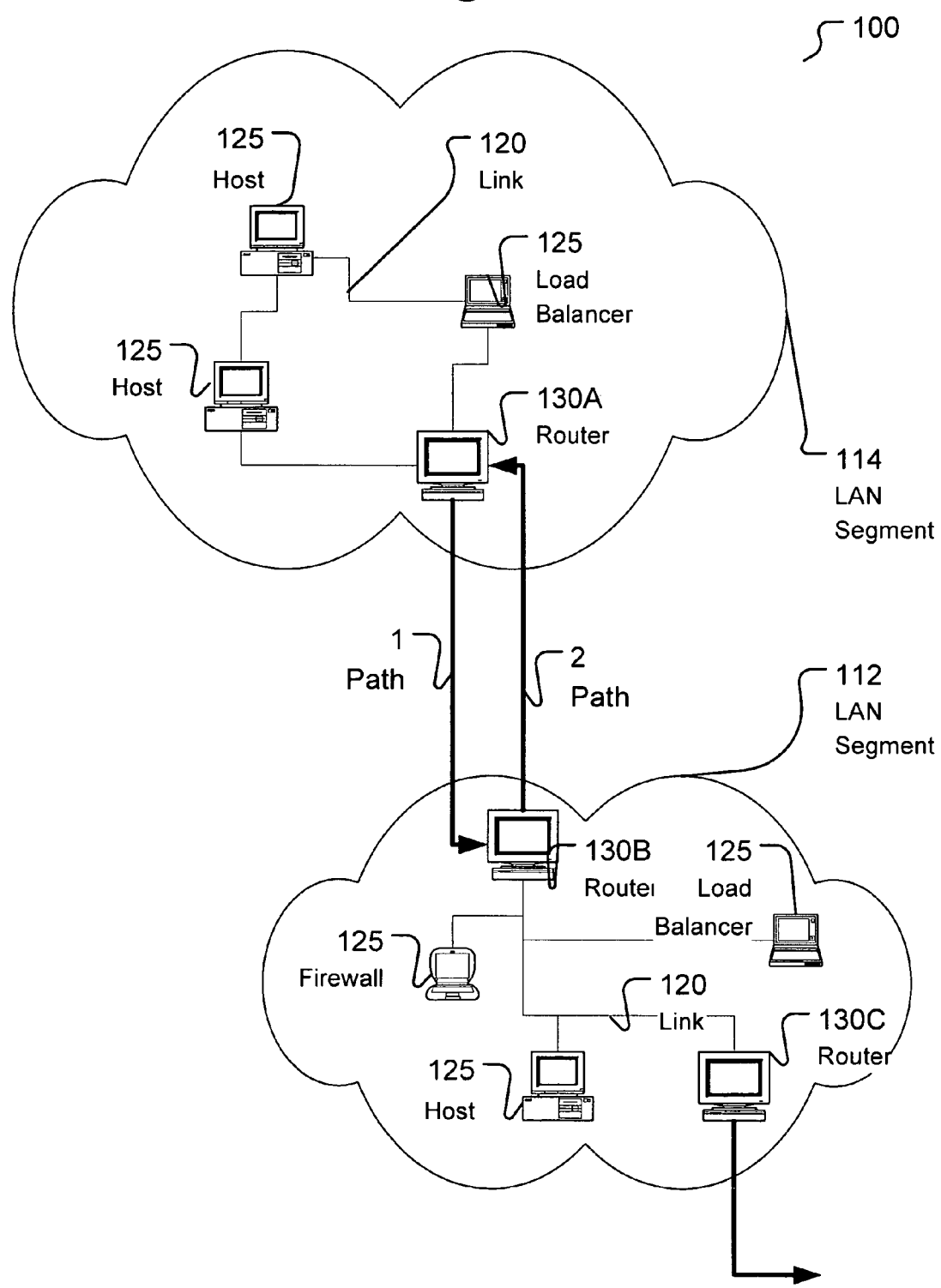
FIG. 1 is a high-level block diagram of a Local Area Network (LAN) configured in accordance with one embodiment of the invention.

FIG. 1 is a high level block diagram of a typical LAN 110 comprised of two segments 112 and 114. Each segment contains a multiple links 120 between nodes 125. Nodes 125 may be hosts, routers, load balancers, firewalls, or any other network device currently known or yet to be deployed in a network. Routers 130A, 130B, and 130C are also nodes on the segments. Routers 130A and 130B can communicate with each other over paths 1 and 2, thereby connecting segments 112 and 114.

Network segments 112 and 114 may be Ethernet networks, although the present disclosure is broadly applicable to other network protocols. Stated more formally, although an Ethernet is described, those skilled in the art will realize that networks other than those utilizing Ethernet protocols can be used. Accordingly, the invention is not limited to any particular type of network.

Router 130A, in one exemplary embodiment, may be configured to act as one of the status-discovering nodes for segment 112. As such, router 130A sends messages to all external (to segment 112) nodes 125, one node at a time, to see if the paths to them (e.g., paths 1 or 2) are operational. These messages may be LLC type 1 test frames, although any short test messages with a regular and predefined format may be used. The Logical Link Control (LLC) layer is the higher of the two data link layer sub-layers defined by the IEEE in its Ethernet standards. The LLC sub-layer handles error control, flow control, framing, and MAC-sub-layer addressing. The most prevalent LLC protocol is IEEE Standard 802.2, which includes both connectionless and connection-oriented variants. As the IEEE Standard 802.2 is well-known to those of ordinary skill in the art, further definition and description herein is unnecessary.

Test frames are not sent to locally attached nodes, i.e., hosts 125 within segment 112, in order to reduce intra-segment traffic. Only nodes outside of segment 112 (referred to herein as "destination" nodes) are sent messages.

Return messages are generated by the destination nodes and sent back to the source node (i.e., the status-discovering node) for collection and matching to transmitted test messages. The return message may be a simple echo of the test message or a different, confirming message may be sent. Either way, the presence of a return message acknowledging (in some sense) the transmitted message provides a complete, end-to-end test of path continuity and therefore its status.

One advantage of using the LLC Type 1 test message is that it is purely a Layer 2 approach that does not propagate any overhead to Layer 3 or above in the protocol stack. Accordingly, the low overhead on the source and destination nodes makes for low round-trip delay and hence improved link fault detection timeliness.

Note that this statusing approach differs from the link integrity test used to determine the health of a link as far back as 10Base-T Ethernet. As described in the Cisco Press Internetworking Technology Handbook in Chapter 2:

10Base-T was also the first Ethernet version to include a link integrity test to determine the health of the link. Immediately after power-up, the physical medium attachment (PMA) sublayer transmits a normal link pulse (NLP) to tell the NIC at the other end of the link that this NIC wants to establish an active link connection:

If the NIC at the other end of the link is also powered up, it responds with its own NLP.

If the NIC at the other end of the link is not powered up, this NIC continues sending an NLP about once every 16 ms until it receives a response.

The link is activated only after both NICs are capable of exchanging valid NLPs.

Clearly, the 10Base-T integrity check is only used at initial power-up, to establish the link between the Network Interface Cards (NICs) in two hosts. The statusing mechanism herein described, by contrast, operates continuously to keep track of segment host status. Indeed, in some exemplary embodiments, the status test message is sent approximately once per second (rather than once only, at initialization in the prior art) in order to keep all status information current.

FIG. 2 illustrates, in flowchart form, the process whereby the network efficiency is improved by the present disclosure. The process begins on power-up of a status-detecting node, 210. Initially, each status-detecting node performs a discovery step 215 to identify its nearest (adjacent) network neighbors outside of the status host's own network segment and their status, using conventional means. Alternatively, a status-detecting node may refer to the initial status and adjacency information supplied to it in a local configuration file.

Next, the status-detecting node begins sending test messages 220 to each nearest neighbor not within the status-detecting node's 95 segment. After each message, the status-detecting node waits a pre-determined time (on the order of 500 milliseconds) for a response, 230. Test 240 is a simple binary test on the reply received: if the reply matches the expected message (branch 242), then the link or path is up and working. The status of that connection is then marked as "up" in the local adjacency status table, 244.

In some embodiments, the local adjacency status table is a separate table in the local routing information base (RIB); it may also be separate and distinct from the RIB. The adjacency status table is not, however, a part of the local routing table when that term is used as implying a distinction from the RIB.

If, however, the return message is not as expected or does not arrive at all within the pre-determined wait time, branch 246 is taken and the link path status is marked as "down" in step 248.

In a preferred embodiment, the pre-determined wait time is specified in a configuration table (or file) supplied to the status discovery process or coded into software as a default value of, for example, one second. This link-specific wait time may then be adjusted (not shown) according to the (known) speed of each link and the actual round-trip time (RTT) through means well-known to those of ordinary skill in the art. Thus, for distant (long) links operating at slow speeds, the discovery process will increase the link-specific wait time during the initial discovery. In particular, the method will never mark a link as "down" until it first verifies the RTT wait time by finding (and marking) the link as "up," as depicted by secondary test 270.

In marking the link down in the adjacency status table, there may be several degrees of "down" indicated. The link may be down because it is overly congested, i.e., when no replies are received in the wait period for several tries. Alternately, the link may be marked down because the destination node is itself down or congested.

Furthermore, the link may be down because the network or a segment thereof is down as signaled through for example, a routine routing table update. This information may be included by using different symbols for the different states or by encoding the information using two or more bits through methods well-known in the art.

The updated path status from either step 244 or 248 is then used to update the local node's adjacency status table 250, which in turn forces a Routing Information Base (RIB) update, 255. The process waits approximately one second, 260, before sending a test message to the next host in step 220, repeating the cycle indefinitely or until commanded to cease or power-down. (As noted above, in some embodiments the wait time is dynamically adjusted to reflect the actual RTT to each node).

The wait durations described above are examples only. Longer or shorter wait times 230 (before declaring a lack of response message as a link "down" indicator) and 260 (recycle time between messages) are also useable. The length of wait determines the degree to which message traffic overhead (from the test messages and their responses) impact the overall network's performance. Obviously, longer waits (especially at recycle step 260) decrease message overhead, but at the cost of additional latency before status updates hit the router table and can be propagated through the network.

The present method can be practiced by a single node, by a plurality of nodes, or by all nodes in a segment or network. When multiple nodes each act as independent status discoverers, very rapid RIB/routing table updates will result as nodes, links, or paths come up or go down. In such a scenario, link state information may be updated on the order of once every five or ten seconds, a significant improvement over prior methods of monitoring link status.

According to another practice for improving network efficiency, a 'compaction' method is described herein that will 'substitute' fixed values in a packet header with a 'tag' value to reduce switching overhead. It is common for data and telecommunications communications switching gear to use ATM switch fabrics as their core-switching matrix. These switch fabrics provide deterministic switching bandwidth at a commodity cost to the vendor. However, they require that variable length packet data be "cellified" (broken into cells) before transmission over the switch matrix. This "cellification" process induces overhead into I/O bandwidth of the data stream, increasing the total amount of bandwidth required to carry a given set of packets. The cellification process adds two types of overhead; a cell header which provides switch routing and cell reassembly control and padding to cells when the data frame is not an even modulus of the cell size (which is commonly the case). This cell overhead is commonly referred to as the cell tax. The cell tax is especially painful when the original packet data size only slightly exceeds a single cell size. For these cases the cell tax is over 100% (2× the overhead plus the cell size−1 byte).

An exemplary IP frame header is given in the Table below.

```
 0  1  2  3  4  5  6  7  8  9  0  1  2  3  4  5  6  7  8  9  0  1  2  3  4  5  6  7  8  9  0  1
+-+-+-+-+-+-+-+-+-+-+-+-+-+-+-+-+-+-+-+-+-+-+-+-+-+-+-+-+-+-+-+-+
| Version | IHL |Type of Service|         Total Length          |
+-+-+-+-+-+-+-+-+-+-+-+-+-+-+-+-+-+-+-+-+-+-+-+-+-+-+-+-+-+-+-+-+
|       Identification          |Flags|     Fragment Offset     |
+-+-+-+-+-+-+-+-+-+-+-+-+-+-+-+-+-+-+-+-+-+-+-+-+-+-+-+-+-+-+-+-+
| Time to Live  |   Protocol    |        Header Checksum        |
+-+-+-+-+-+-+-+-+-+-+-+-+-+-+-+-+-+-+-+-+-+-+-+-+-+-+-+-+-+-+-+-+
|                         Source Address                        |
+-+-+-+-+-+-+-+-+-+-+-+-+-+-+-+-+-+-+-+-+-+-+-+-+-+-+-+-+-+-+-+-+
|                       Destination Address                     |
|          Options                            | Padding         |
+-+-+-+-+-+-+-+-+-+-+-+-+-+-+-+-+-+-+-+-+-+-+-+-+-+-+-+-+-+-+-+-+
```

For example: take a cell size of 64 bytes with a four-byte cell header (i.e. each cell can carry 60 bytes of data). In this case a 60 byte frame exactly fits into a 64 byte cell and only incurs a ~6% increase in the I/O bandwidth consumed across the switch fabric. However, a 61 byte frame requires two cells and incurs 109% overhead across the switch plane.

This 'overhead' effect is quickly amortized for packets that exceed two cell sizes, so it is only for small packet sizes that are just over the cell size that this inefficiency occurs. A solution to this problem requires that the initial packet size be reduced before the cellification process. While 'compression' algorithms exist, they require intense processor cycles and software complexity, as do label based path substitution algorithms. Therefore an approach that is stateless and applies to virtually all packets is better.

Described herein is a 'compaction' method that will 'substitute' fixed values in a packet header with a 'tag' value. From analysis, it is a realization that the TCP/IP header in the example application carries 8 bytes that can be removed and substituted (from a 'standard' 20 byte header) by categorizing the following IP frame types as a standard frame type and recognizing some inherent aspects of IPv4 forwarding. The processes described herein then use a 'frame type code' as a tag across the switch fabric to indicate this type.

The following presents on example of a process and analysis that may be employed with the systems and methods described herein:

1. Select IPv4 frames which are not-optioned and not fragmented.
    This allows for removing the 'version', 'ihl', 'flags' and fragment offset fields, (3 bytes).
2. Remove the Total Length and Checksum fields
    The total length field is not needed once it is verified on input. The total frame length will be carried across the switch fabric in the frame header, thus it can removed from the IP header. The checksum would have been verified on input and will need to be recalculated on output, so it can be removed. (4 bytes)
3. Remove five bits from the Type of Service Field
4. Remove three bits from the Time to Live Field
    Both DSCP and IP Precedence mapping only use three bits of the TOS field. The maximum TTL field being used is 0x1f. (1 byte).

As set out above and as described herein, the compaction method will substitute fixed values in a packet header with a tag value. This reduces the amount of data that needs to be processed and allows for quicker amortization of overhead.

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

What is claimed is:

1. A method of improving network availability in a segmented network, comprising the steps of:
    selecting a source network segment including a source node;
    selecting a destination network segment including a plurality of destination nodes;
    periodically transmitting a test message over a plurality of communication links from the source node in communication with the source network segment to the plurality of destination nodes, each of the plurality of destination nodes being in communication with the destination network segment;
    generating, for each of the plurality of destination nodes, a return message to be transmitted to the source node if the test message is received at the destination node;
    determining, at the source node in the source network segment, the status of each of the plurality of communication links in response to the return messages generated by the plurality of destination nodes in the destination network segment, wherein determining the status comprises indicating a fault in one of said one or more paths if said source node does not receive at least a predetermined number of return messages from said destination nodes in response to a predetermined number of test messages transmitted to said destination nodes; and
    transmitting the determined status of each of the plurality of communication links from the source node in the source network segment to each of the plurality of destination nodes in the destination network segment that generated the return message.

2. The method of claim 1, and further comprising the step of configuring one of said paths between said source node and said one or more destination nodes in response to the determined status.

3. The method of claim 1, wherein the test message is a Logical Link Control type 1 frame format.

4. The method of claim 1, wherein the return message is an echo message generated in response to the test message.

5. The method of claim 1, wherein the source and destination nodes are selected from the group consisting of a host, a router and a load balancer.

6. The method of claim 1, and further comprising the step of updating a routing table in response to the determined status.

7. The method of claim 1, wherein the step of configuring includes avoiding paths through dead links between nodes or pats connecting to unresponsive destination nodes.

8. The method of claim 1, wherein determining the status includes the steps of: waiting a pre-determined period of time for the return message from a destination node, and if the status of the destination node has changed, the source node updating a local adjacency status table, and propagating an updated routing table to other nodes on the segmented network.

9. The method of claim 1, wherein the test message is not sent within the source network segment.

10. The method of claim 1, wherein the test message is transmitted approximately once per second.

11. A system for improving availability comprising:
    a plurality of destination nodes in a destination network segment in communication with a respective one of a plurality of destination network segments, each of the destination nodes configured to receive a test message through one of a plurality of communication links and generate a return message;
    a source node in a source network segment in communication with each of the plurality of destination nodes in the destination network segment, the source node configured to provide a test message to each of the plurality of destination nodes in the destination network segment, and for determining the status, at the source node in the source network segment, of each of the plurality of communications links in response to the return messages, wherein determining the status comprises indicating a fault in one of said one or more paths if the source node does not receive at least a predetermined number of return messages from each of the plurality of destination nodes in response to a predetermined number of test messages transmitted to each of the plurality of destination nodes; and a configuration update module in communication with the source node in the source network segment and the plurality of destination nodes in the destination network segment, the configuration update module transmitting the determined status of each of the plurality of communications links from the source node in the source network segment to each of the destination nodes in the destination network segment that provides the return message.

12. The system of claim 11 wherein the source node transmits the test message approximately once per second.

13. The system of claim 11 wherein the source nodes and the destination nodes are selected from the group consisting of a host, a router and a load balancer.

14. The system of claim 11 wherein the test message is a Logical Link Control type 1 frame format.

15. The system of claim 11 wherein the return message is an echo message of the test message.

16. A system for improving network availability in a segmented network, comprising:

a first network segment having a plurality of connected source nodes, a second network segment having a plurality of connected destination nodes, said second network segment connected to said first network segment over one or more paths;

identification means for identifying from one or more source nodes in the first network segment one or more cooperating destination nodes in the second network segment;

transmission means for periodically transmitting a lest message over the one or more paths from a source node in the first network segment to one or more destination nodes in the second network segment; said transmission means in response to a return message received from said destination nodes in the second network segment, determining the status of said one or more paths;

status update means for transmitting the determined status from said source node in the first network segment to each of the plurality of destination nodes in the second network segment that generated the return message; and fault indicating means for indicating a fault in one of said one or more paths if said source node does not receive at least a predetermined number of return messages from said destination nodes in response to a predetermined number of test messages transmitted to said destination nodes.

17. The system of claim 16, further comprising configuration means for configuring one of said paths between said source node and said destination nodes in response to said determined status.

* * * * *